(12) United States Patent
Li et al.

(10) Patent No.: US 11,146,691 B2
(45) Date of Patent: *Oct. 12, 2021

(54) INFORMATION REMINDING METHOD AND APPARATUS, AND ELECTRONIC TERMINAL

(71) Applicant: HUAWEI TECHNOLOGIES CO., LTD., Guangdong (CN)

(72) Inventors: Zijun Li, Shenzhen (CN); Jin Huang, Shenzhen (CN); Fen Yang, Nanjing (CN); Guoliang Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/774,352

(22) Filed: Jan. 28, 2020

(65) Prior Publication Data

US 2020/0236223 A1    Jul. 23, 2020

Related U.S. Application Data

(60) Continuation of application No. 16/171,268, filed on Oct. 25, 2018, now Pat. No. 10,587,761, which is a
(Continued)

(51) Int. Cl.
*H04M 11/00* (2006.01)
*H04M 15/00* (2006.01)
(Continued)

(52) U.S. Cl.
CPC ........ *H04M 15/83* (2013.01); *H04L 43/0876* (2013.01); *H04L 43/16* (2013.01);
(Continued)

(58) Field of Classification Search
None
See application file for complete search history.

(56) References Cited

U.S. PATENT DOCUMENTS 8,817,659 B2   8/2014  Nieuwland et al.
9,219,790 B1  12/2015  Filev et al.
(Continued)

FOREIGN PATENT DOCUMENTS

CN    101854649 A    10/2010
CN    101867946 A    10/2010
(Continued)

OTHER PUBLICATIONS

Chinese Office Action issued in Chinese Application No. 2014/0001372.4 dated Jul. 3, 2017, 7 pages.
(Continued)

*Primary Examiner* — Erika A Washington
(74) *Attorney, Agent, or Firm* — Slater Matsil, LLP

(57) ABSTRACT

Systems, methods, and software can be used to provide reminding information. In some aspect, a special event is determined to occur. In response to determining that the special event occurs, a network type currently used by a device is acquired. Historical network usage information corresponding to the network type is determined. The network type and a traffic usage situation is outputted based on the historical usage information.

21 Claims, 5 Drawing Sheets

Related U.S. Application Data division of application No. 15/126,524, filed as application No. PCT/CN2014/075659 on Apr. 18, 2014, now abandoned.

(51) Int. Cl.

| | | |
|---|---|---|
| *H04W 4/24* | (2018.01) | |
| *H04L 12/26* | (2006.01) | |
| *H04L 29/08* | (2006.01) | |
| H04W 84/04 | (2009.01) | |
| H04W 84/12 | (2009.01) | |

(52) U.S. Cl.
CPC ............. *H04L 67/22* (2013.01); *H04L 67/36* (2013.01); *H04W 4/24* (2013.01); H04W 84/042 (2013.01); H04W 84/12 (2013.01)

(56) References Cited

U.S. PATENT DOCUMENTS

| | | | |
|---|---|---|---|
| 9,560,185 B2 | 1/2017 | Nelson et al. | |
| 10,045,269 B2 | 8/2018 | Zhu et al. | |
| 10,587,761 B2* | 3/2020 | Li | H04M 15/83 |
| 2004/0044623 A1 | 3/2004 | Wake et al. | |
| 2005/0043012 A1 | 2/2005 | Benco et al. | |
| 2005/0070251 A1 | 3/2005 | Satake et al. | |
| 2005/0272452 A1 | 12/2005 | Khoury et al. | |
| 2010/0017506 A1 | 1/2010 | Fadell | |
| 2010/0317338 A1 | 12/2010 | Ohsawa | |
| 2011/0276442 A1* | 11/2011 | Momtahan | G06Q 30/00 705/30 |
| 2012/0036556 A1* | 2/2012 | LeBeau | G06F 21/31 726/3 |
| 2012/0054661 A1 | 3/2012 | Rados et al. | |
| 2012/0101952 A1 | 4/2012 | Raleigh et al. | |
| 2012/0185803 A1 | 7/2012 | Wang et al. | |
| 2012/0309345 A1 | 12/2012 | Wake et al. | |
| 2013/0132854 A1 | 5/2013 | Raleigh et al. | |
| 2013/0149994 A1* | 6/2013 | Gaddam | H04M 15/8214 455/406 |
| 2013/0272144 A1 | 10/2013 | Dong et al. | |
| 2014/0098671 A1 | 4/2014 | Raleigh et al. | |
| 2014/0280660 A1 | 9/2014 | Khandewale et al. | |
| 2015/0199439 A1 | 7/2015 | Hahn et al. | |
| 2016/0360392 A1 | 12/2016 | Yoo | |

FOREIGN PATENT DOCUMENTS

| | | |
|---|---|---|
| CN | 102612084 A | 7/2012 |
| CN | 102711098 A | 10/2012 |
| CN | 102711110 A | 10/2012 |
| CN | 103002466 A | 3/2013 |
| CN | 103067938 A | 4/2013 |
| CN | 103179589 A | 6/2013 |
| CN | 103248756 A | 8/2013 |
| CN | 103259690 A | 8/2013 |
| CN | 103476064 A | 12/2013 |
| CN | 103561454 A | 2/2014 |
| CN | 103686663 A | 3/2014 |
| GB | 2494858 A | 3/2013 |
| JP | 2005110027 A | 4/2005 |
| JP | 2006507566 A | 3/2006 |
| JP | 2011135353 A | 7/2011 |
| JP | 2012138904 A | 7/2012 |
| JP | 2014022844 A | 2/2014 |
| KR | 20120073840 A | 7/2012 |
| WO | WO2009099033 A1 | 8/2009 |
| WO | WO2012047932 A2 | 4/2012 |
| WO | WO2014032509 A1 | 3/2014 |

OTHER PUBLICATIONS

Extended European Search Report issued in European Application No. 14889375.3 dated Mar. 2, 2017, 27 pages.
International Search Report and Written Opinion issued in International Application No. PCT/CN2014/075659 dated Jan. 28, 2015, 15 pages.
Japanese Office Action issued in Japanese Application No. 2016-558782 dated Nov. 28, 2017, 13 pages.
Korean Office Action issued in Korean Application No. 10-2016-70262277 dated Jul. 17, 2017, 8 pages.

* cited by examiner

INFORMATION REMINDING METHOD AND APPARATUS, AND ELECTRONIC TERMINAL

CROSS-REFERENCE TO RELATED APPLICATIONS

This application is a continuation of U.S. patent application Ser. No. 16/171,268, now U.S. Pat. No. 10,587,761, filed on Oct. 25, 2018, which is a Divisional Application of U.S. patent application Ser. No. 15/126,524, filed on Sep. 15, 2016, which is a National Stage of International Application No. PCT/CN2014/075659, filed on Apr. 18, 2014. All of the aforementioned applications are hereby incorporated by reference in their entireties.

TECHNICAL FIELD

The present invention relates to the field of Internet technologies, and in particular, to an information reminding method and apparatus, and an electronic terminal.

BACKGROUND

Currently, manners in which a mobile terminal accesses the Internet are generally classified into a cellular network manner and a WLAN manner, and there is an obvious difference between different access manners in terms of fees. Generally, no payment is required when the WLAN manner is adopted to access the Internet; however, payment is required when the cellular network manner is adopted, and fees significantly increase after traffic consumption of a user exceeds preset package traffic of the user or in a case of international roaming.

In an actual using process, in a process of operating an application program, a case of using excessive traffic in a fee-charging network usually occurs because a user forgets which Internet access manner is being used by the current application program.

SUMMARY

Embodiments of the present invention provide an information reminding method and apparatus, and an electronic terminal, which can notify a user of a current network type and historical traffic data so as to remind the user of consumption of network traffic.

To achieve the foregoing objective, the following technical solutions are adopted in the embodiments of the present invention.

According to a first aspect, an embodiment of the present invention provides an information reminding method, including:
  when it is monitored that a special event occurs, acquiring a network type currently used by a device;
  determining, according to the acquired network type, network historical usage information corresponding to the network type; and
  reminding a user according to the network historical usage information, so as to notify the user of the currently used network type and a traffic usage situation.

With reference to the first aspect, in a first possible implementation manner, the special event includes one or more of a to-be-monitored user operation, a handover of the current network type of the device, enabling of a to-be-monitored application program, and a case in which network traffic used by a to-be-monitored application program exceeds a threshold.

With reference to the first possible implementation manner of the first aspect, in a second possible implementation manner, the method further includes:
  presenting to the user all application programs installed on a system, and setting a to-be-monitored application program according to selection of the user; or
  receiving a list of to-be-monitored application programs that is pushed by a server, and setting a to-be-monitored application program according to an application program in the list of to-be-monitored application programs; or
  receiving a list of to-be-monitored application programs that is sent by a server in response to a query request of the user equipment, and setting a to-be-monitored application program according to an application program in the list of to-be-monitored application programs, where the query request of the user equipment can be used to represent an application program installed on the user equipment; or
  presenting to the user a user operation that can be identified by a system, and setting a to-be-monitored user operation according to selection of the user.

With reference to the first aspect or either of the first two possible implementation manners of the first aspect, in a third possible implementation manner, before the determining, according to the acquired network type, network historical usage information corresponding to the network type, the method further includes:
  determining whether the network type currently used by the device is a to-be-monitored network type, where the to-be-monitored network type includes at least a payment-required type; and
  the determining, according to the acquired network type, network historical usage information corresponding to the network type includes:
  when the network type currently used by the device is the to-be-monitored network type, determining, according to the acquired network type, the network historical usage information corresponding to the network type.

With reference to the first aspect or either of the first two possible implementation manners of the first aspect, in a fourth possible implementation manner, the reminding a user includes:
  presenting the currently used network type and the traffic usage situation to the user in one or a combination of multiple manners of four presentation manners of a text, a picture, an animation, and audio, and stopping the presentation after a preset time elapses.

According to a second aspect, an embodiment of the present invention provides an information reminding apparatus, including:
  an event monitoring module, configured to monitor whether a special event currently occurs on a device;
  a network monitoring module, configured to: when it is monitored that a special event occurs, acquire a network type currently used by the device; and determine, according to the acquired network type, network historical usage information corresponding to the network type; and
  an input and output module, configured to remind a user according to the network historical usage information, so as to notify the user of the currently used network type and a traffic usage situation.

With reference to the second aspect, in a first possible implementation manner, the special event includes one or more of a to-be-monitored user operation, a handover of the current network type of the device, enabling of a to-be-monitored application program, and a case in which network traffic used by a to-be-monitored application program exceeds a threshold.

With reference to the first possible implementation manner of the second aspect, in a second possible implementation manner, the input and output module is further configured to present to the user all applications programs installed on a system; or configured to receive a list of to-be-monitored application programs that is pushed by a server; or configured to receive a list of to-be-monitored application programs that is sent by a server in response to a query request of the user equipment, where the query request of the user equipment can be used to represent an application program installed on the user equipment; or configured to present to the user a user operation that can be identified by a system; and the event monitoring module is further configured to set a to-be-monitored application program according to selection of the user; or configured to set a to-be-monitored application program according to an application program in the list of to-be-monitored application programs; or configured to set a to-be-monitored user operation according to selection of the user.

With reference to the second aspect or either of the first two possible implementation manners of the second aspect, in a third possible implementation manner, the network monitoring module is further configured to: determine whether the network type currently used by the device is a to-be-monitored network type, where the to-be-monitored network type includes at least a payment-required type; and when the network type currently used by the device is the to-be-monitored network type, determine, according to the acquired network type, the network historical usage information corresponding to the network type.

With reference to the second aspect or either of the first two possible implementation manners of the second aspect, in a fourth possible implementation manner, the input and output module is specifically configured to: present the currently used network type and the traffic usage situation to the user in one or a combination of multiple manners of four presentation manners of a text, a picture, an animation, and audio, and stop the presentation after a preset time elapses.

According to a third aspect, an embodiment of the present invention further provides an electronic terminal, including a processor, a memory, and an input and output module, where the memory stores at least a computer program, and the processor is configured to invoke the program stored in the memory, so as to control the input and output module, and the processor, the memory, and the input and output module communicate with each other by using a bus; where the processor is configured to determine whether a network type currently used by a device is a to-be-monitored network type;

the memory is configured to store network historical usage information and current network information; and the input and output module is further configured to remind a user according to the network historical usage information, so as to notify the user of the currently used network type and a traffic usage situation.

With reference to the third aspect, in a first possible implementation manner of the third aspect, the special event includes one or more of a to-be-monitored user operation, a handover of the current network type of the device, enabling of a to-be-monitored application program, and a case in which network traffic used by a to-be-monitored application program exceeds a threshold.

With reference to the first possible implementation manner of the third aspect, in a second possible implementation manner of the third aspect, the input and output module is further configured to present to the user all application programs installed on a system; or configured to receive a list of to-be-monitored application programs that is pushed by a server; or configured to present to the user a user operation that can be identified by a system; and the processor is further configured to set a to-be-monitored application program according to selection of the user; or configured to set a to-be-monitored application program according to an application program in the list of to-be-monitored application programs; or configured to receive a list of to-be-monitored application programs that is sent by the server in response to a query request of the user equipment, where the query request of the user equipment can be used to represent an application program installed on the user equipment; or configured to set a to-be-monitored user operation according to selection of the user.

With reference to the third aspect or either of the first two possible implementation manners of the third aspect, in a third possible implementation manner of the third aspect, the processor is further configured to: determine whether the network type currently used by the device is a to-be-monitored network type, where the to-be-monitored network type includes at least a payment-required type; and when the network type currently used by the device is the to-be-monitored network type, determine, according to the acquired network type, the network historical usage information corresponding to the network type.

With reference to the third aspect or either of the first two possible implementation manners of the third aspect, in a fourth possible implementation manner of the third aspect, the input and output module is specifically configured to: present the currently used network type and the traffic usage situation to the user in one or a combination of multiple manners of four presentation manners of a text, a picture, an animation, and audio, and stop the presentation after a preset time elapses.

According to the information reminding method and apparatus and the electronic terminal provided in the embodiments of the present invention, a network type used by a user can be automatically monitored, and the user can be reminded, according to an actual situation, of network information and traffic information concerned by the user. In this case, it can be avoided that the user uses excessive traffic in a network in which traffic is charged, so that a benefit of the user is ensured.

BRIEF DESCRIPTION OF DRAWINGS

To describe the technical solutions in the embodiments of the present invention, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The technical solutions provided in the present invention may be applied to an application scenario in which a client device accesses the Internet by using different Internet access manners. In this application scenario, the user equipment generally includes a handheld terminal, a tablet computer, a wearable device, a household computer, a multimedia device that can be connected to the Internet, and the like, and the Internet access manners include a cellular network manner, a WLAN manner, and the like.

Based on the solutions, the present invention provides the following embodiments to resolve a technical problem of how to remind a user of network usage information.

Figure 1:
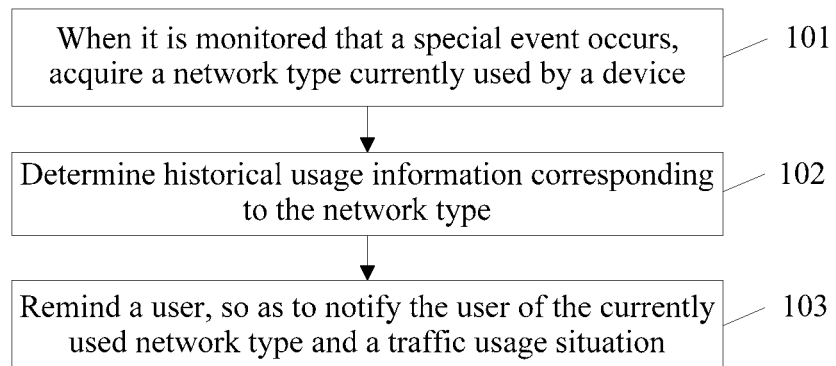
FIG. 1 is a flowchart of an information reminding method according to an embodiment of the present invention.

An embodiment of the present invention provides an information reminding method. As shown in FIG. 1, the method includes the following steps:

101. When it is monitored that a special event occurs, acquire a network type currently used by a device.

The special event is an event that triggers the terminal to acquire the current network type of the terminal, which may include one or more of a to-be-monitored user operation, a handover of the current network type of the device, enabling of a to-be-monitored application program, and a case in which network traffic used by a to-be-monitored application program exceeds a threshold.

The to-be-monitored user operation refers to a user operation instruction for the device, for example, an operation of touching a physical key to wake up a terminal, or an operation of tapping a virtual icon on a touchscreen to unlock.

The handover of the current network type of the device refers to a handover of the user equipment from one to another network type, such as a cellular network or a WLAN, that can be used by the device, for example, a handover from the cellular network to the WLAN or a handover from the WLAN back to the cellular network. Identification of a handover of the network type may be specifically implemented by determining whether different communications modules have traffic data to send and receive, and this embodiment of the present invention does not set a further limitation thereto.

The enabling of the to-be-monitored application program means that the application program automatically runs or is triggered to run by the user by tapping an icon.

The case in which the network traffic used by the to-be-monitored application program exceeds the threshold means that after the application program is enabled and is connected to the Internet, data received from a network side and data sent to the network side exceed a specific threshold. The threshold herein is set to range from multiple KBs to tens of MBs, and the threshold is specifically set according to a requirement.

The foregoing mentioned network type generally refers to a network type such as a WLAN or a cellular network. After using networks of these types, the user equipment may communicate with the Internet to acquire network information.

In addition, in this embodiment of the present invention, the special event may be set, and a specific setting method is subsequently described in detail.

The foregoing network type generally refers to a network, such as a cellular network or a WLAN, that the user equipment can access when being connected to the Internet.

102. Determine, according to the acquired network type, historical usage information corresponding to the network type.

The network historical usage information includes traffic, usage duration, a type of transmitted content, which may specifically include traffic and duration used within a charging period, a traffic limitation of a traffic package, a type and a size of a transmitted file, and the like. When traffic transmission is being performed between the device and the network side, the foregoing various types of parameters corresponding to different network types are stored as historical usage information. In the technical solution of the present invention, these network historical usage information and the corresponding network types are stored together in a memory of the device, and when a network type used by a current device is acquired by means of identification, the corresponding network historical usage information may be directly extracted from the memory.

103. Remind a user according to the network historical usage information, so as to notify the user of the currently used network type and a traffic usage situation.

For an implementation manner of performing reminding, a detailed description is subsequently provided in the technical solution of the present invention.

In this solution, after the foregoing steps are executed, a network type used by a user can be automatically monitored, and the user can be reminded, according to an actual situation, of network information and traffic information concerned by the user. In this case, it can be avoided that the user uses excessive traffic in a network in which traffic is charged, so that a benefit of the user is ensured.

Figure 2:
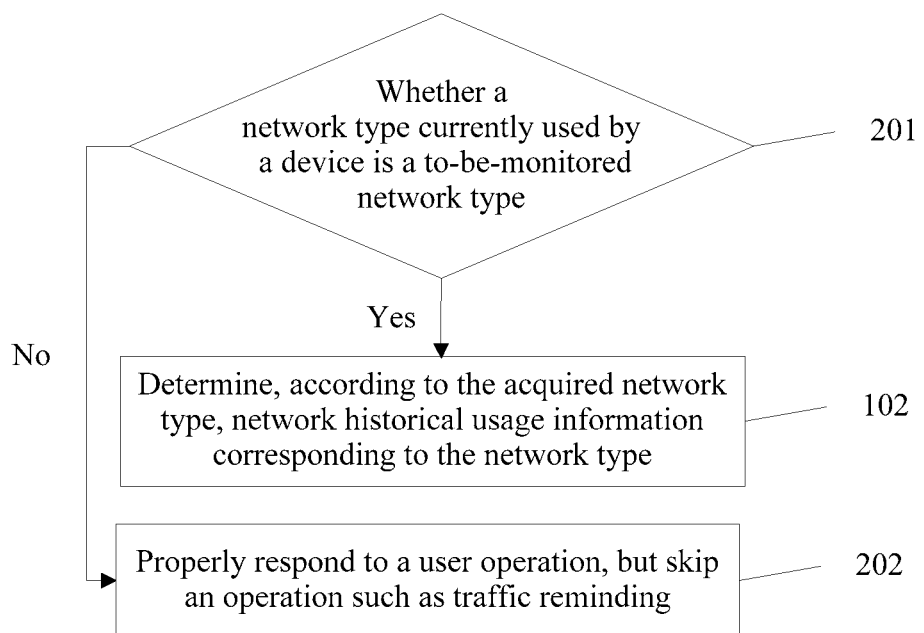
FIG. 2 is a flowchart of a method for determining a network type used by a user according to an embodiment of the present invention.

Further, this embodiment of the present invention further provides the following technical solution, so as to determine the network type used by the user. As shown in FIG. 2, executed before step 102, the technical solution includes the following steps:

201. Determine whether the network type currently used by the device is a to-be-monitored network type, and if the network type is a to-be-monitored network type, execute step 102, or if the network type is not a to-be-monitored network type, execute step 202.

The to-be-monitored network type includes at least a payment-required network type such as a cellular network. Specifically, a network type that needs to be monitored may be set by the user.

102. Determine, according to the acquired network type, the network historical usage information corresponding to the network type.

202. Properly respond to a user operation, but skip an operation such as traffic reminding.

In this solution, after the foregoing steps are executed, after a special event is triggered on a client, monitoring and determining of a network type can be directly performed. For different network types, charging manners are different; a user needs to be reminded in some charging manners, and the user does not need to be reminded in other charging manners. Reminding information needed by the user is promptly provided, so that favorable experience can be provided for the user.

Figure 3:
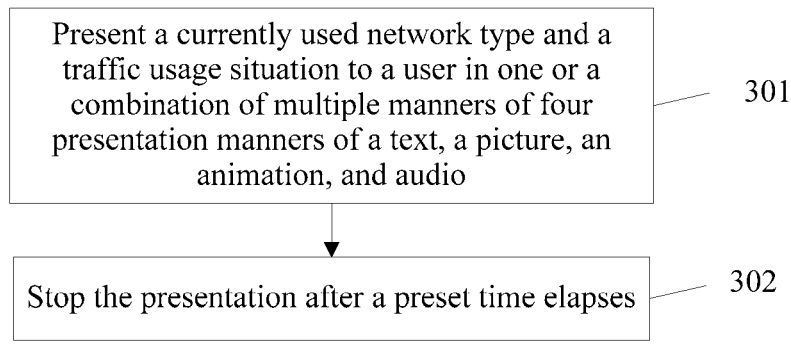
FIG. 3 is a flowchart of a method for reminding a user of information according to an embodiment of the present invention.

Further, in order to remind the user, for step 103, this embodiment of the present invention further provides the following specific implementation manner. As shown in FIG. 3, the implementation manner includes the following steps:

301. Present the currently used network type and the traffic usage situation to the user in one or a combination of multiple manners of four presentation manners of a text, a picture, an animation, and audio.

Figure 4:
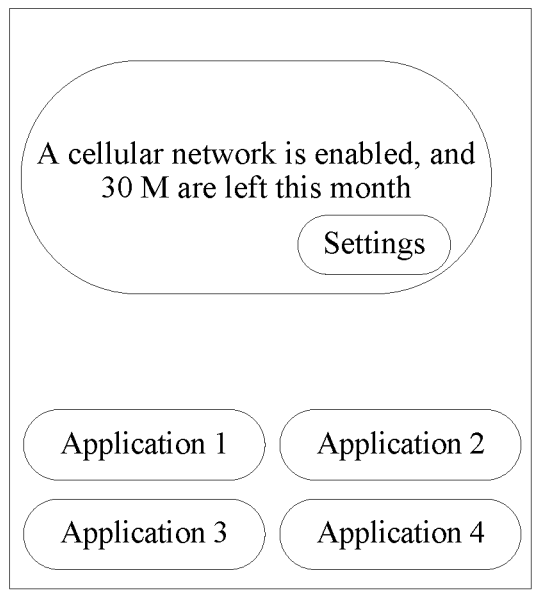
FIG. 4 is a schematic diagram of a scenario of a content display manner according to an embodiment of the present invention.

For specific displayed content and a specific display manner, reference may be made to a schematic diagram shown in FIG. 4. The diagram is a reminding effect diagram. In the diagram, reminding information is displayed in a form of a floating window, and the reminding information "a cellular network is enabled, and 30 M are left this month" is specifically provided. In addition, a setting key is further provided at the lower right corner of a reminding box, so that the user can set duration for displaying the reminding box or on/off and handover of the network type. Further optionally, when the floating box is being presented, vibration or a special sound effect of the device may also be enabled to remind the user to read the reminding information in the floating box.

302. Stop the presentation after a preset time elapses.

The preset time is set by the user or preset by a system.

In this solution, after the foregoing steps are executed, a reminding function may be completed in a short time, and a case does not occur in which a user's proper use of an application program is interfered because of long-time reminding.

For setting of the special event, the present invention specifically provides the following four specific implementation manners.

Figure 5:
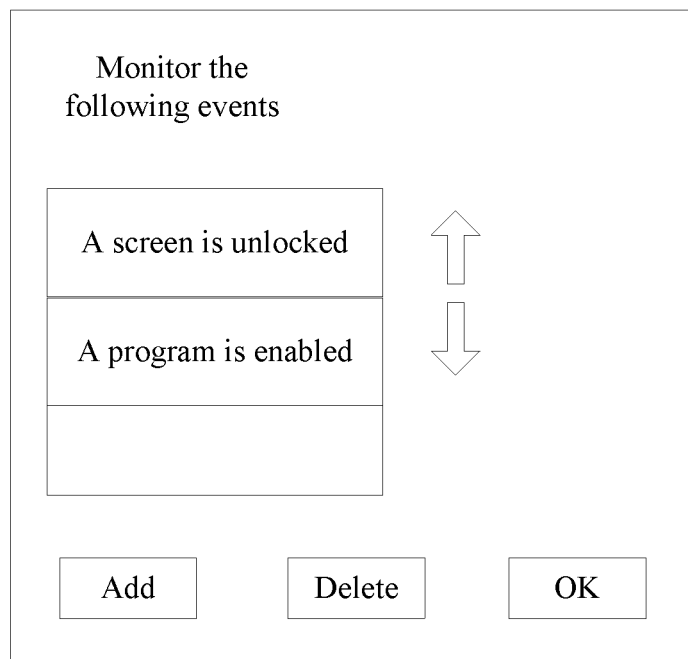
FIG. 5 is a schematic diagram of a scenario of a presentation effect of a user operation according to an embodiment of the present invention.

In the first implementation manner, a user operation that can be identified by the system is presented to the user, and a to-be-monitored user operation is set according to selection of the user. Specifically, a possible presentation effect of the user operation is shown in FIG. 5.

The user operation that can be set and is shown in the figure includes functions such as an add action, a delete action, an action order adjustment. If an action of the foregoing actions is selected, the action may be moved up or down to adjust a location or may be deleted.

In the second implementation manner, a list of to-be-monitored application programs that is pushed by a server is received, and a to-be-monitored application program is set according to an application program in the list of to-be-monitored application programs. Specifically, a possible method for displaying the list is shown in Table 1 below.

TABLE 1

Display example of an application list

| Application program identifier | Version | Name of an installation package |
|---|---|---|
| WeChat | 5.0 | ... |
| Microblog | 3.0 | ... |
| 1000230 | 2.0 | ... |

A list structure shown in the table includes an application program identifier, a version number, and a name of an installation package, and another related parameter may also be displayed in this list. The application program identifier is an attribute for identifying uniqueness of an application program, and may be a name, an ID allocated by the system, a name of an installation package, or the like, and is a mandatory item, and the version number and the like are optional items.

In the third implementation manner, a list of to-be-monitored application programs that is sent by a server in response to a query request of the user equipment is received, and a to-be-monitored application program is set according to an application program in the list of to-be-monitored application programs, where the query request of the user equipment can be used to represent an application program installed on the user equipment.

It should be noted that the second implementation manner and the third implementation manner are relatively similar, and for a display manner of the list of application programs, reference may be made to the content shown in Table 1 above. A difference between the two manners in technical implementation lies in that the server actively performs triggering and the user requests triggering. In a mechanism in which the server actively performs triggering, the server sends, in a form of a list, all summarized application programs that need to be monitored to the user equipment, so that the user equipment selects a to-be-monitored application program by itself. However, in a mechanism in which the user requests triggering, generally, the user sends, in a form of a list, the application program installed on the device to the server, then the server determines whether the installed application program needs to be monitored, and finally, the server feeds back, in a form of a list, a to-be-monitored application program corresponding to the device to the user equipment, so that the user equipment selects a to-be-monitored application program by itself.

In the fourth implementation manner, all application programs installed on the system are presented to the user, and a to-be-monitored application program is set according to selection of the user. For a display method of the application program, reference may be made to the content shown in Table 1 above.

An application program identifier, a version number, a monitoring option, and the like are included. The application program identifier is an attribute for identifying uniqueness of an application program, may be a name, an ID allocated by the system, a name of an installation package, or the like, and is a mandatory item. The version number and the like are optional items, and the monitoring option is used by the user to select an application program that needs to be monitored.

Figure 6:
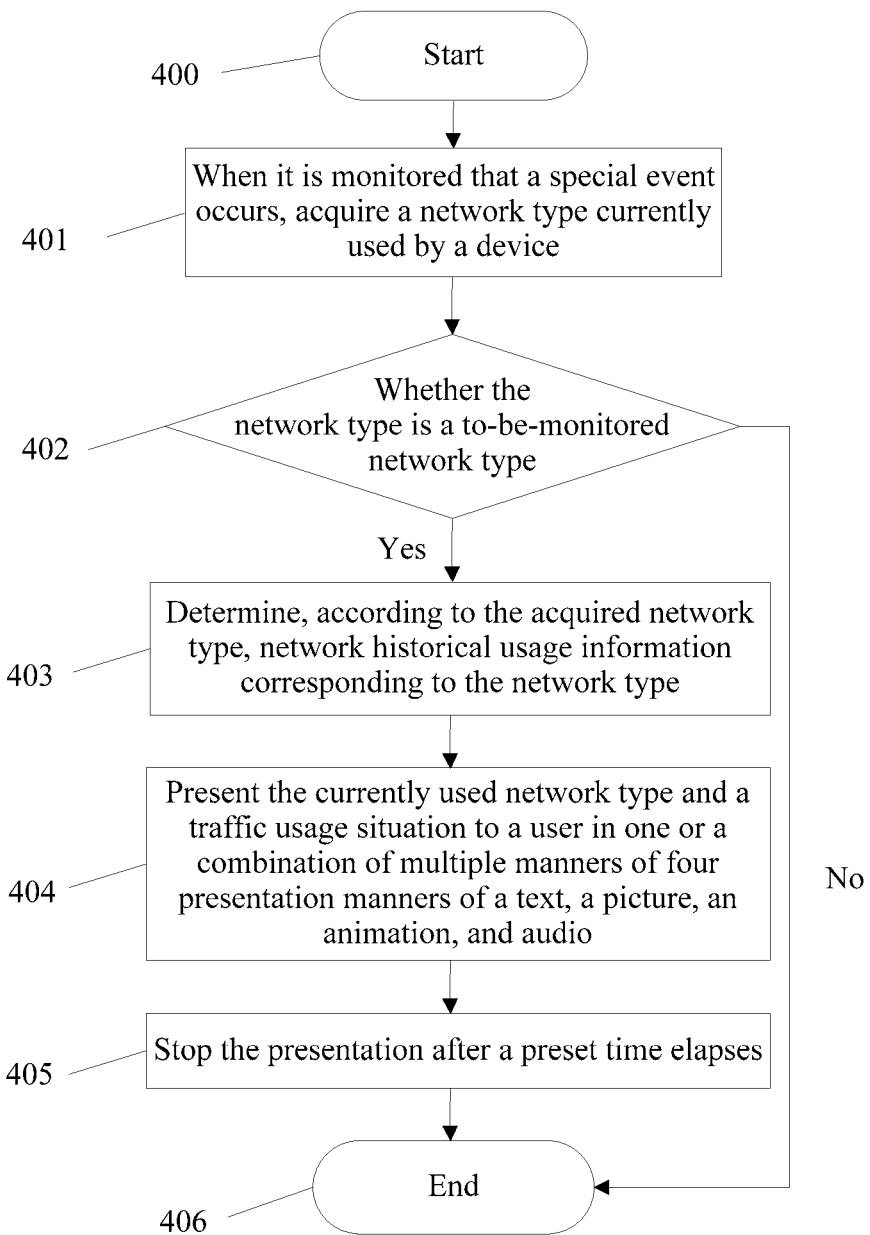
FIG. 6 is a flowchart of an overall information reminding method according to an embodiment of the present invention.

With reference to the foregoing all technical solutions, an embodiment of the present invention further provides a schematic diagram of an overall information reminding procedure. As shown in FIG. 6, the procedure includes the following steps:

400. Start a processing procedure.

401. When it is monitored that a special event occurs, acquire a network type currently used by a device.

402. Determine whether the network type currently used by the device is a to-be-monitored network type, and if the network type is a to-be-monitored network type, execute step 403, or if the network type is not a to-be-monitored network type, properly respond to a user operation, but skip an operation such as traffic reminding.

403. Determine, according to the acquired network type, network historical usage information corresponding to the network type.

404. Present the currently used network type and a traffic usage situation to a user in one or a combination of multiple manners of four presentation manners of a text, a picture, an animation, and audio.

405. Stop the presentation after a preset time elapses.

406. End the processing procedure.

Figure 7:
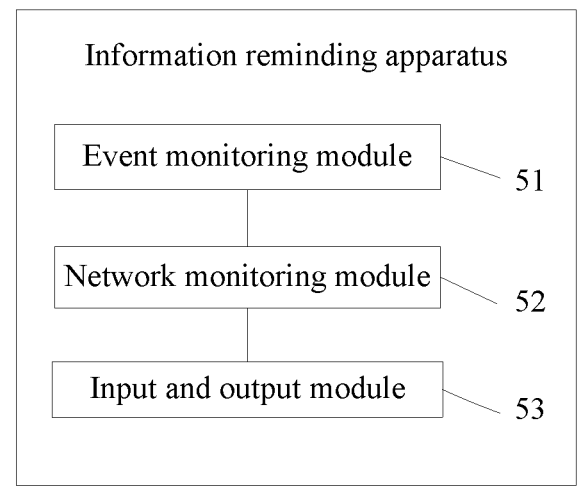
FIG. 7 is a block diagram of composition of an information reminding apparatus according to an embodiment of the present invention.

An embodiment of the present invention provides an information reminding apparatus. As shown in FIG. 7, the apparatus includes:

an event monitoring module 51, configured to monitor whether a special event currently occurs on a device;

a network monitoring module 52, configured to: when it is monitored that a special event occurs, acquire a network type currently used by the device; and determine, according to the acquired network type, network historical usage information corresponding to the network type; and an input and output module 53, configured to remind a user according to the network historical usage information, so as to notify the user of the currently used network type and a traffic usage situation.

Optionally, the special event includes one or more of a to-be-monitored user operation, a handover of the current network type of the device, enabling of a to-be-monitored application program, and a case in which network traffic used by a to-be-monitored application program exceeds a threshold.

Optionally, the network monitoring module 52 is further configured to: determine whether the network type currently used by the device is a to-be-monitored network type, where the to-be-monitored network type includes at least a payment-required type; and when the network type currently used by the device is the to-be-monitored network type, determine, according to the acquired network type, the network historical usage information corresponding to the network type.

Optionally, the input and output module 53 is specifically configured to: present the currently used network type and the traffic usage situation to the user in one or a combination of multiple manners of four presentation manners of a text, a picture, an animation, and audio, and stop the presentation after a preset time elapses.

Optionally, the input and output module 53 is further configured to present to the user all application programs installed on a system; or configured to receive a list of to-be-monitored application programs that is pushed by a server; or configured to receive a list of to-be-monitored application programs that is sent by a server in response to a query request of the user equipment, where the query request of the user equipment can be used to represent an application program installed on the user equipment; or configured to present to the user a user operation that can be identified by a system; and use an input operation of the user.

The event monitoring module 51 is further configured to set a to-be-monitored application program according to selection of the user; or configured to set a to-be-monitored application program according to an application program in the list of to-be-monitored application programs; or configured to set a to-be-monitored user operation according to selection of the user.

The information reminding apparatus provided in this embodiment of the present invention can automatically monitor a network type used by a user, and remind, according to an actual situation, the user of network information and traffic information concerned by the user. In this case, it can be avoided that the user uses excessive traffic in a network in which traffic is charged, so that a benefit of the user is ensured.

Figure 8:
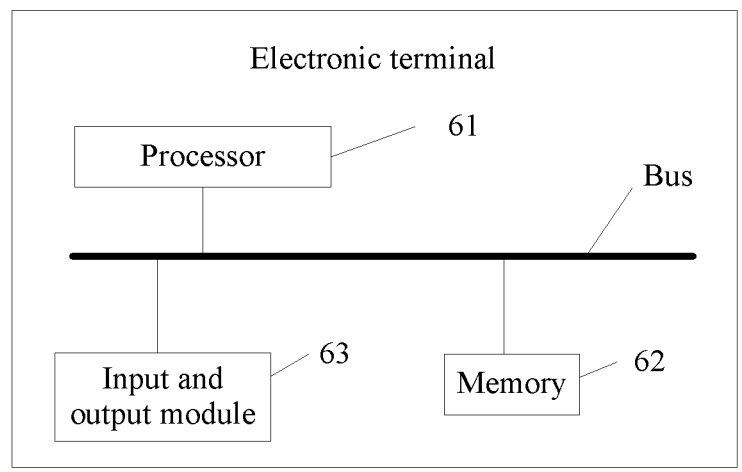
FIG. 8 is a block diagram of composition of an electronic terminal used for information reminding according to an embodiment of the present invention.

An embodiment of the present invention further provides an electronic terminal used for information reminding. As shown in FIG. 8, the electronic terminal includes a processor 61, a memory 62, and an input and output module 63, where the memory 62 is configured to store a computer program, and the processor 61 is configured to invoke the program stored in the memory, so as to control the input and output module 63, and all modules communicate with each other by using a bus, so as to implement method procedures shown in FIG. 1 to FIG. 7. Details are as follows:

The processor 61 is configured to determine whether a network type currently used by a device is a to-be-monitored network type;

the memory 62 is configured to store network historical usage information and current network information; and the input and output module 63 is configured to remind a user according to the network historical usage information, so as to notify the user of the currently used network type and a traffic usage situation.

Optionally, the special event includes one or more of a to-be-monitored user operation, a handover of the current network type of the device, enabling of a to-be-monitored application program, and a case in which network traffic used by a to-be-monitored application program exceeds a threshold.

The processor 61 is further configured to: determine whether the network type currently used by the device is a to-be-monitored network type, where the to-be-monitored network type includes at least a payment-required type; and when the network type currently used by the device is the to-be-monitored network type, determine, according to the acquired network type, the network historical usage information corresponding to the network type.

Optionally, the input and output module 63 is specifically configured to: present the currently used network type and the traffic usage situation to the user in one or a combination of multiple manners of four presentation manners of a text, a picture, an animation, and audio, and stop the presentation after a preset time elapses.

Optionally, the input and output module 63 is further configured to present to the user all application programs installed on a system; or configured to receive a list of to-be-monitored application programs that is pushed by a server; or configured to present to the user a user operation that can be identified by a system.

The processor 61 is further configured to set a to-be-monitored application program according to selection of the user; or configured to set a to-be-monitored application program according to an application program in the list of to-be-monitored application programs; or configured to receive a list of to-be-monitored application programs that is sent by the server in response to a query request of the user equipment, where the query request of the user equipment can be used to represent an application program installed on the user equipment; or configured to set a to-be-monitored user operation according to selection of the user.

The electronic terminal provided in this embodiment of the present invention can automatically monitor a network type used by a user, and remind, according to an actual situation, the user of network information and traffic information concerned by the user. In this case, it can be avoided that the user uses excessive traffic in a network in which traffic is charged, so that a benefit of the user is ensured.

Based on the foregoing descriptions of the implementation manners, a person skilled in the art may clearly understand that the present invention may be implemented by software in addition to necessary universal hardware or by hardware only. In most circumstances, the former is a preferred implementation manner. Based on such an understanding, the technical solutions of the present invention essentially or the part contributing to the prior art may be implemented in a form of a software product. The computer software product is stored in a readable memory medium, such as a floppy disk, a hard disk or an optical disc of a computer, and includes several instructions for instructing a computer device (which may be a personal computer, a server, a network device, or the like) to perform the methods described in the embodiments of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method of indicating network usage information of a mobile terminal, comprising:
    detecting a configuration performed by a user on the mobile terminal, the configuration configuring an event that triggers obtaining of network traffic usage and notification of the network traffic usage by the mobile terminal, the event comprising unlocking the mobile terminal;
    detecting a first user input for unlocking the mobile terminal;
    in response to success of unlocking the mobile terminal by the first user input, obtaining, based on the configuration by the user, network usage information stored in the mobile terminal, wherein the network usage information comprises network traffic usage data; and
    displaying a network traffic usage notification according to the network usage information.

2. The method according to claim 1, wherein the network usage information further comprises at least one network and network traffic data corresponding to the at least one network, and the at least one network comprises at least one of a wireless local area network (WLAN) or a cellular network.

3. The method according to claim 2, wherein the network traffic usage notification comprises the at least one network and the network traffic data corresponding to the at least one network.

4. The method according to claim 1, wherein the method further comprises:
    receiving a setting operation, wherein the setting operation is configured to set a function of displaying the network traffic usage notification in response to success of unlocking the mobile terminal.

5. The method according to claim 1, wherein the network traffic usage notification is provided in a floating window or a floating box.

6. The method according to claim 5, wherein the network usage information further comprises a setting key; and wherein the setting key is provided in the floating window or the floating box.

7. The method according to claim 1, wherein the method further comprises:
    displaying a list of application programs installed on the mobile terminal;
    receiving a selection of the user; and
    managing one or more application programs in the list of the application programs.

8. The method according to claim 1, wherein displaying the network traffic usage notification comprises:
    presenting a currently used network type and a traffic usage situation in at least one manner of a text, a picture, an animation, or audio.

9. The method according to claim 1, wherein the method further comprises:
    stopping displaying the network traffic usage notification.

10. The method according to claim 1, wherein the method further comprises:
    stopping displaying the network traffic usage notification after a preset time elapses.

11. The method according to claim 1, wherein the first user input for unlocking the mobile terminal comprises an operation of touching a physical key to wake up the mobile terminal, or an operation of tapping a virtual icon on a touchscreen to unlock the mobile terminal.

12. The method according to claim 1, wherein the network traffic usage notification is displayed in response to network traffic used by a to-be-monitored application program exceeding a threshold.

13. The method according to claim 1, further comprising:
    in response to the success of unlocking the mobile terminal by the first user input,
    determining whether a currently used network of the mobile terminal is a predetermined type of network to be monitored, and
    upon determining that the currently used network of the mobile terminal is the predetermined type of network, obtaining the network usage information stored in the mobile terminal, wherein the network usage information comprises network traffic usage data of the mobile terminal related to the currently used network.

14. The method according to claim 1, further comprising:
    stopping displaying the network traffic usage notification after a preset time elapses.

15. A mobile terminal, comprising:
    a screen;
    one or more processors; and
    memory storing one or more programs and a first software application, wherein the one or more programs are configured to be executed by the one or more processors, the one or more programs including instructions for:
    detecting a configuration performed by a user on the mobile terminal, the configuration configuring an event that triggers obtaining of network traffic usage and notification of network traffic usage by the mobile terminal, the event comprising unlocking the mobile terminal;
    detecting a first user input for unlocking the mobile terminal;

in response to success of unlocking the mobile terminal by the first user input, obtaining, based on the configuration by the user, network usage information stored in the mobile terminal, wherein the network usage information comprises network traffic usage data; and displaying a network traffic usage notification according to the network usage information.

16. The mobile terminal according to claim 15, wherein the network usage information further comprises at least one network and network traffic data corresponding to the at least one network;

wherein the at least one network comprises at least one of a wireless local area network (WLAN) or a cellular network;

and wherein the network traffic usage notification comprises the at least one network and the network traffic data corresponding to the at least one network.

17. The mobile terminal according to claim 15, wherein the one or more programs further include instructions for:

receiving a setting operation, wherein the setting operation is configured to set a function of displaying the network traffic usage notification in response to success of unlocking the mobile terminal.

18. The mobile terminal according to claim 15, wherein the network traffic usage notification is provided in a floating window or a floating box; wherein the network usage information further comprises a setting key; and wherein the setting key is provided in the floating window or the floating box.

19. The mobile terminal according to claim 15, wherein the one or more programs further include instructions for:

displaying a list of application programs installed on the mobile terminal;

receiving a selection of the user; and managing one or more application programs in the list of the application programs.

20. The mobile terminal according to claim 15, wherein the one or more programs further include instructions for:

presenting a currently used network type and a traffic usage situation in at least one manner of a text, a picture, an animation, or audio; and stopping displaying the network traffic usage notification after a preset time elapses.

21. The mobile terminal according to claim 15, wherein the mobile terminal is a handheld terminal, a tablet computer, or a wearable device.

* * * * *